United States Patent
Leschi et al.

(10) Patent No.: US 9,868,535 B2
(45) Date of Patent: Jan. 16, 2018

(54) METHOD AND A SYSTEM FOR TREATING ICE FOR AN AIRCRAFT WINDSHIELD

(71) Applicant: AIRBUS HELICOPTERS, Marignane (FR)

(72) Inventors: Robert Leschi, Marseilles (FR); Stephane Catris, Marseilles (FR); Gregory Balmain, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 396 days.

(21) Appl. No.: 14/629,754

(22) Filed: Feb. 24, 2015

(65) Prior Publication Data

US 2016/0068272 A1 Mar. 10, 2016

(30) Foreign Application Priority Data

Feb. 26, 2014 (FR) ...................... 14 00490

(51) Int. Cl.
| | |
|---|---|
| *B64D 15/00* | (2006.01) |
| *B64C 1/14* | (2006.01) |
| *B64D 15/14* | (2006.01) |
| *B64D 15/20* | (2006.01) |

(52) U.S. Cl.
CPC ............ *B64D 15/00* (2013.01); *B64C 1/1476* (2013.01); *B64D 15/14* (2013.01); *B64D 15/20* (2013.01)

(58) Field of Classification Search
CPC ...... B64C 1/1476; B64D 15/12; B64D 15/14; B64D 15/20
See application file for complete search history.

(56) References Cited

U.S. PATENT DOCUMENTS

| | | | | | |
|---|---|---|---|---|---|
| 2,414,520 | A | * | 1/1947 | Greenwald | ............ B64D 15/12 219/203 |
| 2,429,420 | A | * | 10/1947 | McMaster | ............... B60S 1/026 106/287.19 |
| 2,773,162 | A | * | 12/1956 | Christensen | ........... B64D 15/12 219/203 |
| 2,806,118 | A | * | 9/1957 | Peterson | ........... B32B 17/10018 219/202 |
| 2,853,589 | A | * | 9/1958 | Crooke | .................. B64D 15/12 219/202 |

(Continued)

FOREIGN PATENT DOCUMENTS

| | | | | |
|---|---|---|---|---|
| CA | 2290386 A1 * | 11/1998 | ............. | B64D 15/12 |
| DE | 10003590 | 8/2001 | | |

(Continued)

OTHER PUBLICATIONS

Cessna, Direct Approach. (Nov. 2007). Direct Approach. Retrieved from https://support.cessna.com/docs/custsupt/directapproach/Archives/nov07.html.*

(Continued)

*Primary Examiner* — Tien Q Dinh
*Assistant Examiner* — Aaron M Rodziwicz
(74) *Attorney, Agent, or Firm* — Brooks Kushman P.C.

(57) ABSTRACT

A method of treating ice for a windshield of an aircraft, in which method at least two distinct de-icing zones of the windshield are defined. During a de-icing step, at least one de-icing means is activated temporarily in order to de-ice the de-icing zones in succession and in a given cycle.

20 Claims, 3 Drawing Sheets

(56) References Cited

U.S. PATENT DOCUMENTS

| | | | | |
|---|---|---|---|---|
| 3,288,983 | A | * | 11/1966 | Lear, Sr. ............... B64C 1/1476 219/203 |
| 3,813,519 | A | * | 5/1974 | Jochim .................. B41F 15/08 101/126 |
| 3,982,092 | A | * | 9/1976 | Marriott ................. H05B 3/84 219/203 |
| 4,497,083 | A | * | 2/1985 | Nielsen, Jr. ........... B60S 1/3805 15/250.06 |
| 5,182,431 | A | * | 1/1993 | Koontz ................... H05B 3/84 219/203 |
| 7,928,345 | B2 | | 4/2011 | Briggs |
| 2006/0086715 | A1 | * | 4/2006 | Briggs .............. B32B 17/10174 219/488 |
| 2008/0223842 | A1 | | 9/2008 | Petrenko et al. |
| 2013/0048622 | A1 | | 2/2013 | Markowitz et al. |

FOREIGN PATENT DOCUMENTS

| | | | |
|---|---|---|---|
| EP | 1405742 | | 4/2004 |
| EP | 1642829 A1 | * | 4/2006 ........... B64C 1/1476 |
| FR | 2905669 A1 | * | 3/2008 ........... B64C 1/1476 |
| FR | 2988666 A1 | * | 10/2013 ........... B60S 1/3402 |
| GB | 734772 | | 8/1955 |

OTHER PUBLICATIONS

Canadian Search Report Dated Apr. 11, 2016, Application No. 2,881,032, Applicant Airbus Helicopters, 5 Pages.

Korean Notice of Preliminary Rejection dated May 31, 2016, Application No. 2015-0019682, Applicant Airbus Helicopters, 3 Pages.

French Search Report for FR 1400490, Completed by the French Patent Office dated Oct. 13, 2014, 6 Pages.

* cited by examiner

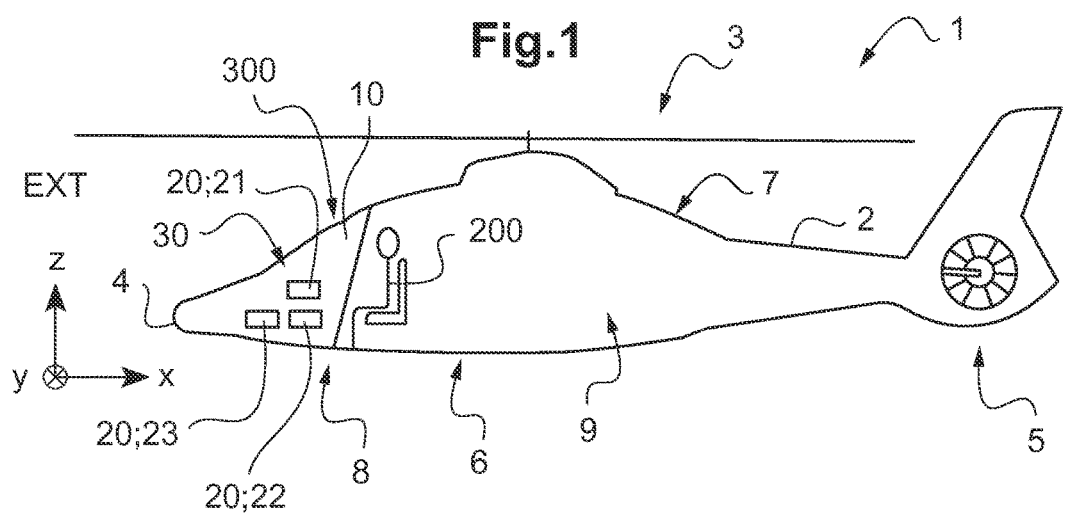
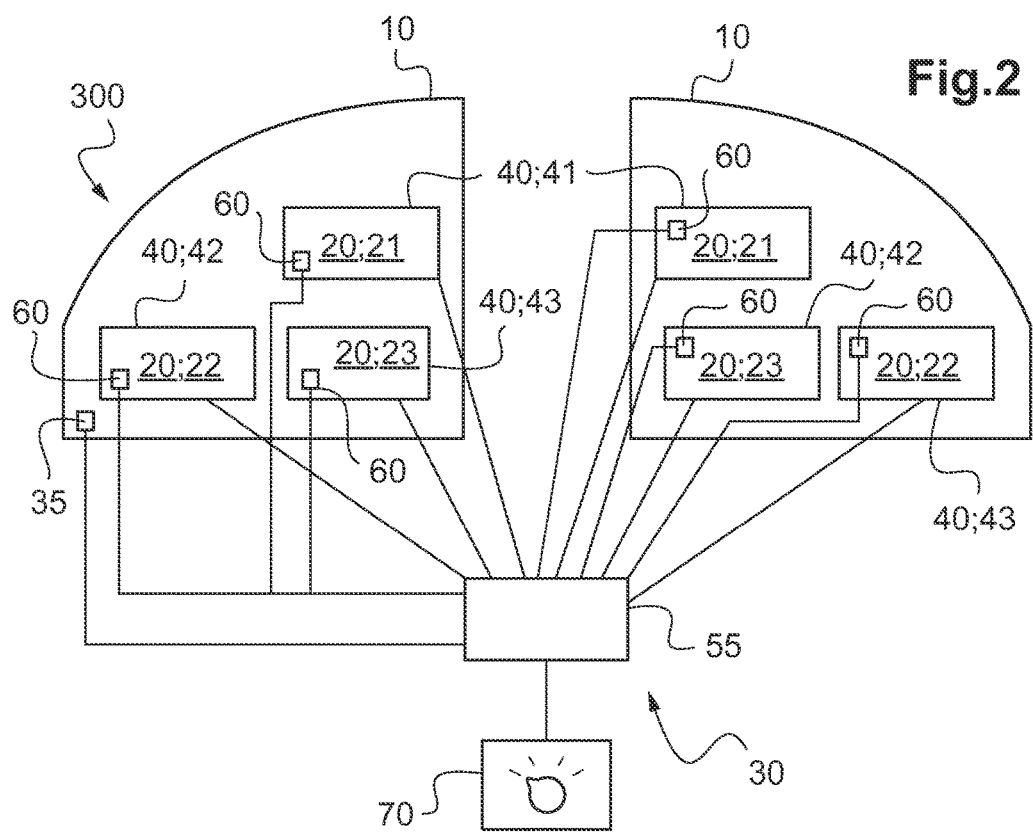

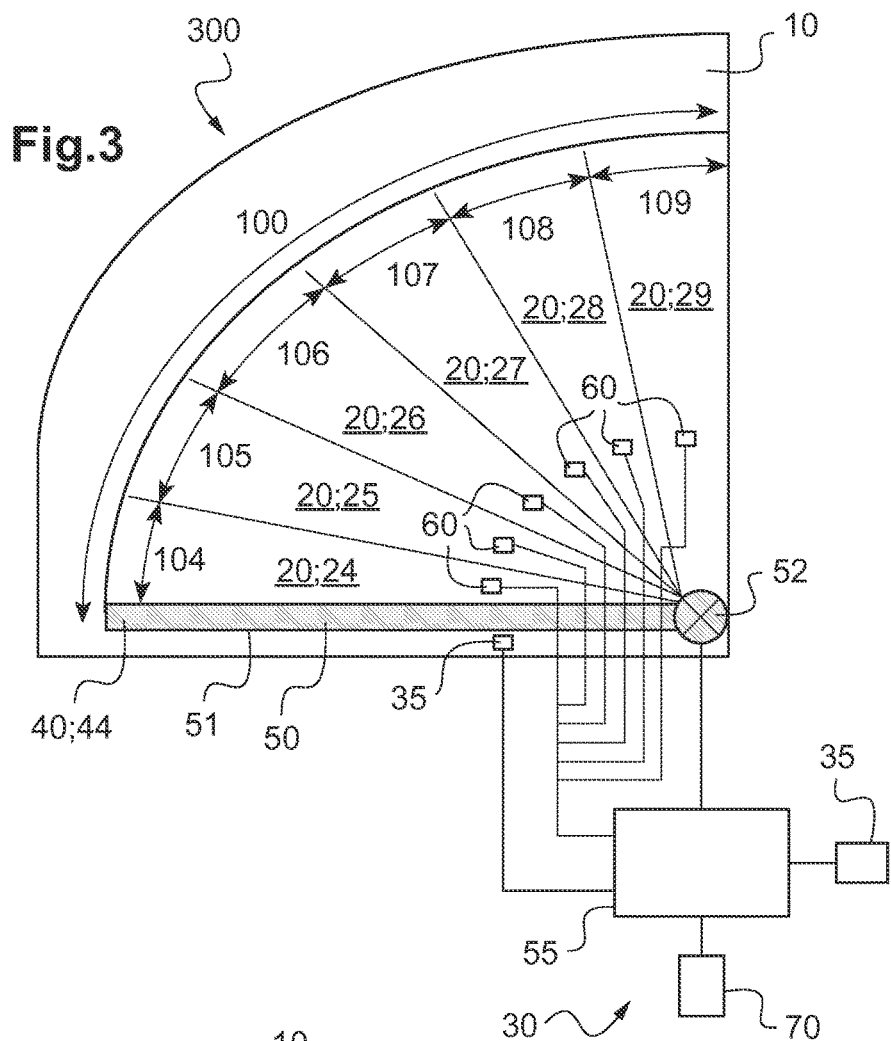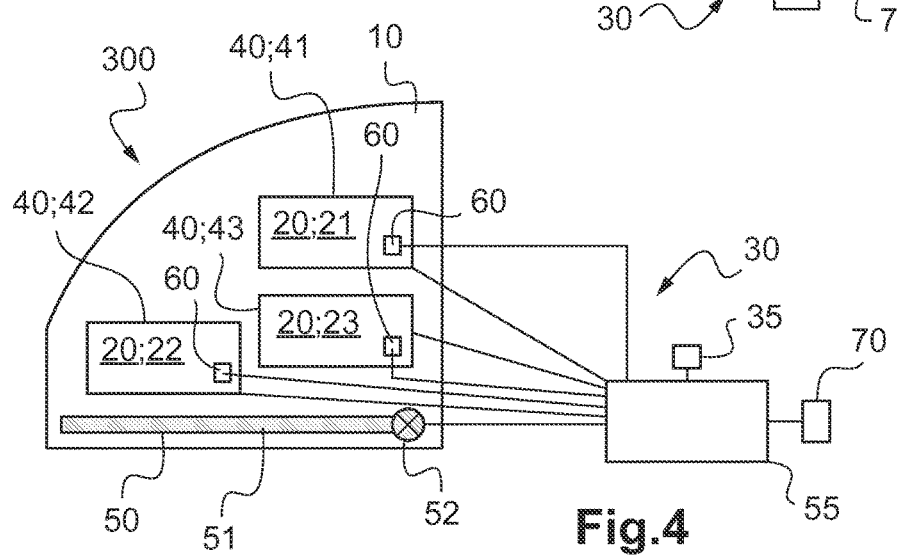

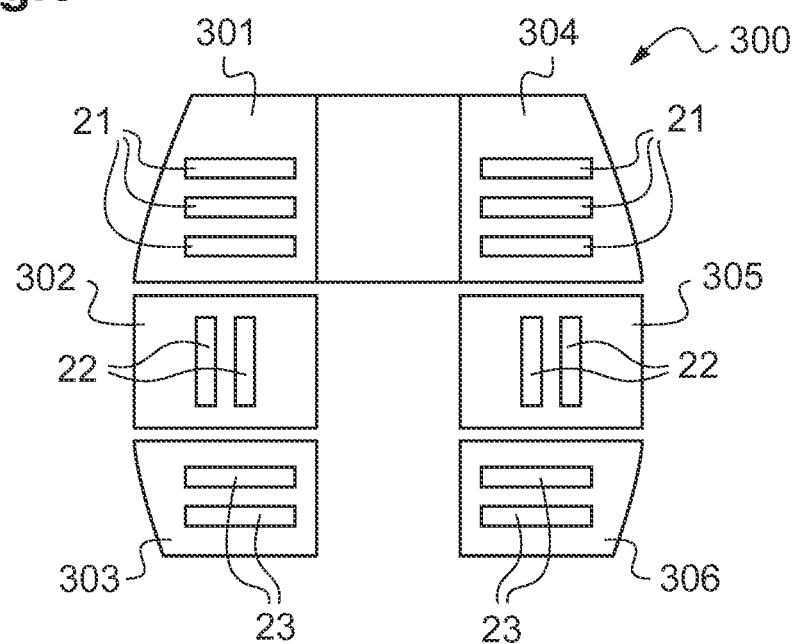

METHOD AND A SYSTEM FOR TREATING ICE FOR AN AIRCRAFT WINDSHIELD

CROSS REFERENCE TO RELATED APPLICATION

This application claims priority to French patent application No. FR 14 00490 filed on Feb. 26, 2014, the disclosure of which is incorporated in its entirety by reference herein.

BACKGROUND OF THE INVENTION (1) Field of the Invention

The present invention relates to a method and to a device for treating ice on a windshield of an aircraft, and more particularly of a rotary wing aircraft.

The present invention thus relates to the technical field of de-icing the windshield of an aircraft in the event of flying in icing conditions.

(2) Description of Related Art

Aircraft, and in particular rotorcraft, may operate under flying conditions that lead to windshields icing. By way of example, such rotorcraft may fly at altitudes that are often lower than 10,000 feet or about 3000 meters.

Ice gives rise to operational limitations in aviation. For example, ice degrades the performance of the lift and propulsion members of an aircraft, or indeed its navigation systems.

Furthermore, ice can obscure a windshield and can thus reduce visibility for crew.

In order to combat icing of a member, two methods may be implemented.

A first method is referred to as "anti-icing". Anti-icing consists in treating a member continuously in order to prevent ice forming on the member under icing conditions.

The anti-icing method presents the advantage of avoiding any deposition of ice. In contrast, the anti-icing method suffers from the drawback of requiring large amounts of energy, given that it operates continuously.

The weight of an anti-icing device and its energy consumption can degrade the potential payload/range, in particular for helicopters where the payload capacity is very sensitive to any change in empty weight.

A second method is referred to as "de-icing".

It should be observed that the term "de-icing" is sometimes used misleadingly to cover not only de-icing proper, but also anti-icing.

De-icing consists in accepting that ice will become deposited in partial or transient manner, and then in destroying the deposit.

To summarize, anti-icing consists in preventing ice forming, whereas de-icing consists in eliminating ice that has been deposited.

A de-icing system therefore does not operate continuously during flight in icing conditions, but only once a certain quantity of ice has become deposited. Such a de-icing system can then be designed so as to limit its consequences on the empty weight of the aircraft, but at the cost of reduced effectiveness.

The de-icing method thus nevertheless leads to accepting a deposit of ice that might significantly degrade the performance of the aircraft.

In addition, whereas operating an anti-icing system may involve continuously consuming a "moderate" amount of electrical power, operating a de-icing system may involve transient consumption of a large amount of electrical power in order to eliminate a deposit of ice.

Unfortunately, the amount of electrical power available in flight on an aircraft is limited. Under such circumstances, in order to combat ice on windshields, and in particular aircraft windshields, present protection techniques consist essentially in making use of an anti-icing method.

Anti-icing techniques for a windshield may require a heater film or a wire array to be incorporated in the windshield. Sensors, distributed over the windshield, then monitor the surface temperature of the windshield, and switch on or off a stage of heating as a function of reaching temperature thresholds.

Unless countermanded by the crew, the anti-icing system for a windshield is activated continuously during a mission, i.e. before, during, and after the appearance of icing conditions.

Document U.S. Pat. No. 7,928,345 describes a windshield containing within a resistive coating that is connected to an electrical power supply.

Document GB 734 772 suggests using an ammonia-based gas to combat ice.

Document US 2008/0223842 describes a windshield having a resistive coating. The resistive coating is electrically powered at high voltage obtained by transforming low voltage electricity by means of converters and inverters.

That document thus relates to increasing the voltage of an electric circuit powered at 12 volts (V), while an electric circuit of a helicopter anti-icing system conventionally requires powering at 200 V.

Document US 2013/0048622 describes a system for blowing hot air onto a transparent surface.

Also known are Document EP 1 405 742 and Document DE 100 03590.

BRIEF SUMMARY OF THE INVENTION

An object of the present invention is thus to propose an alternative method for combating ice at least on a windshield of an aircraft, and in particular of a rotorcraft.

The invention thus provides a method of treating ice for a canopy of an aircraft, the canopy including at least one windshield, the method comprising the following steps:

defining at least two distinct de-icing zones of the windshield; and during a de-icing step, temporarily activating at least one de-icing means to de-ice said de-icing zones in succession in a given cycle of importance for the visibility made available to crew.

The invention thus proposes de-icing at least one windshield as contrasted to anti-icing it.

For this purpose, a windshield is subdivided into a plurality of distinct de-icing zones. In the method, only one de-icing zone is de-iced at a time, with the de-icing zone for de-icing being selected in a given cycle.

Likewise, it is possible to subdivide a plurality of windshields of a canopy into a plurality of de-icing zones that are de-iced one after another in a determined order, and in particular in an order of importance for crew visibility.

Individual windshields cover an area that is tending to increase compared with certain aircraft of the past. Under such circumstances, the total power needed for anti-icing a windshield using a known technique can be high. By way of example, a windshield having an area of three square meters and requiring electrical power of 5 kilowatts per square meter ($kW/m^2$) in order to perform anti-icing means that it is necessary to deliver a power of 15 kilowatts (kW).

The invention proposes using such power not for permanently anti-icing the windshield, but rather for de-icing the windshield in part and temporarily, for example. Power of 15 kW makes it possible for de-icing means to de-ice a small de-icing zone of a windshield. Since de-icing is not performed continuously, the invention makes it possible to achieve energy savings compared with an anti-icing system.

Consequently, it is decided to heat certain predefined portions of the windshield at temperatures that are much higher than the temperatures needed for conventional anti-icing. Since the method requires high power, it is accepted that the power of the system can be reduced by reducing the de-icing area that is to be heated. The invention thus proposes subdividing the surface are of the windshield into a plurality of windows that are de-iced one after another in a determined order, possibly an order of importance for visibility.

By way of example, de-icing may be performed either electrothermally, or by induction, or by laser emission, or by infrared emission.

Compared with anti-icing solutions, this technology can present the advantage of being used when required, e.g. at the time the aircraft is exiting icing conditions, thus enabling its consumption of electricity to be limited and thus limiting its impact on the flight endurance of the aircraft.

Installing such a de-icing method on an aircraft might appear to be surprising. The method assumes that a deposit of ice can be accepted even though it degrades a pilot's visibility. However, while a rotorcraft is flying in icing conditions, those conditions are referred to as instrument meteorological conditions (IMC), or in other words flying is in any event being performed with the help of instruments for flying without visibility because of clouds, regardless of whether or not vision is obscured by ice. The invention thus goes against prejudice by considering in particular that heating the windshield in an icing cloud is not strictly necessary, even though the crew might find that advantageous for having a windshield that is clean on exiting such conditions.

The method may include one or more of the following characteristics.

Thus, the de-icing step may be performed when the aircraft is no longer flying in icing conditions, or at the request of a pilot.

While flying in icing conditions, a pilot's visibility might in any event be restricted, thus justifying flying on instruments. Under such circumstances, ice deposition may have a limited impact on visibility that is already limited as a result of flying conditions.

In contrast, the de-icing operation can begin immediately on exiting icing conditions, and thus when meteorological conditions become more favorable. This exit from unfavorable conditions can be determined by conventional means, such as an ice detector. This exit may also be determined from the altitude of the aircraft and from meteorological members, where such meteorological members are used to estimate meteorological data including for example the ceiling of a cloud layer and the visibility available to a pilot.

In another alternative, a pilot may activate de-icing manually, should that be necessary, or may even determine which de-icing cycle should be applied as a function of requirements. The cycle seeks to determine the order of de-icing as a function of the visibility that the crew seeks to obtain. During level flight, a pilot may give preference to forward visibility towards the front of the aircraft. In contrast, during a landing stage a pilot may give preference to downward visibility relative to the aircraft.

Thus, de-icing may be activated either manually by an individual, or else automatically when the instruments have detected that the aircraft has left icing conditions.

Unlike a conventional permanent anti-icing method, the method of the invention makes it possible to avoid requiring power for treating ice on the windshield while in icing conditions, with such power being used essentially only on exiting such icing conditions. With power consumption targeted in this way it is possible to de-ice the windshield. Once de-iced, the windshield may optionally be subjected to a conventional anti-icing process in order to enable it to be kept clean.

Furthermore, for the aircraft extending longitudinally from a front end to a rear end, at least one de-icing zone referred to as a "front" de-icing zone may be defined on at least one windshield for giving a pilot forward visibility towards the front of the aircraft.

For example, the canopy may have a plurality of windshields, in particular a "top" windshield facing a pilot's head. This top windshield may be subdivided into a plurality of front zones.

The given cycle may then begin by giving precedence to de-icing the front zones one after another in order to give precedence to forward visibility for the pilot.

In a first variant, for the aircraft extending laterally from a left side to a right side and in elevation from a low portion to a high portion, at least one de-icing zone referred to as a "lateral" zone may be defined on at least one windshield giving a pilot lateral visibility towards one side of the aircraft, and/or at least one de-icing zone referred to as a "low" de-icing zone may be defined giving a pilot downward visibility relative to the aircraft.

This embodiment proposes de-icing zones that are very distinct, possibly as a function of stored priorities and/or of priorities as determined by pilots.

For example, the canopy may have a plurality of windshields, in particular a top windshield level with a pilot's head, an "intermediate" windshield, and a "bottom" windshield situated level with a pilot's feet. The top windshield may then possibly be subdivided into a plurality of front zones, the intermediate windshield being subdivided into a plurality of lateral zones, and the bottom windshield being subdivided into a plurality of low zones.

It is then possible to de-ice the de-icing zones one after another, beginning initially with the front zones, then continuing with the lateral zones, and finally ending with the low zones.

In a second variant, the aircraft has a windshield wiper capable of wiping a predetermined total angular sector, and the total angular sector is subdivided into a plurality of distinct small angular sectors each defining a de-icing zone.

In addition to a method, the invention seeks to provide a device for performing the method.

The invention thus provides a device for treating the ice of a canopy that includes a windshield of an aircraft.

For a windshield that comprises at least two distinct de-icing zones, the ice treatment device includes at least one de-icing means and an ice detection system, the device having a control unit communicating with said de-icing means to de-ice said at least two de-icing zones in succession in application of a given cycle of importance for the visibility made available to crew.

Each de-icing means may be incorporated in or fastened to a windshield. For example, the device may comprise one de-icing means per de-icing zone.

In contrast, the ice detection system and/or the control unit may be incorporated in a windshield, fastened to a windshield, or located away from the windshield.

De-icing may for example be performed using de-icing means operating either electrothermally, or by induction, or by laser emission, or by infrared emission.

Each de-icing means may be arranged on the windshield, within the windshield, or indeed on a windshield wiper, for example.

In a first embodiment, the ice treatment device includes at least two de-icing means for de-icing respective distinct de-icing zones, said control unit activating the two de-icing means one after another.

For an aircraft extending longitudinally from a front end to a rear end, said at least two de-icing means may comprise at least front de-icing means arranged at a de-icing zone referred to as a "front" zone of at least one windshield giving a pilot forward visibility towards the front of the aircraft, with the control unit initially activating the front de-icing means in the event of ice being detected.

The term "arranged at" means that the de-icing means are arranged on or within the windshield in order to cover the de-icing zone in question.

For an aircraft extending laterally from a left side to a right side and in elevation from a low portion to a high portion, said at least two de-icing means may comprise at least one lateral de-icing means arranged at a de-icing zone referred to as a "lateral" zone of at least one windshield giving a pilot lateral visibility towards one side of the aircraft and/or at least one bottom de-icing means arranged at at least one de-icing zone referred to as a "low" zone of the windshield giving a pilot downward visibility relative to the aircraft.

For example, three de-icing means may seek to de-ice respectively one after another a front zone, a lateral zone, and a low zone of the windshield.

In a second embodiment, said ice treatment device includes a windshield wiper carrying de-icing means, said windshield wiper being capable of wiping a predetermined total angular sector, said total angular sector including a plurality of distinct small angular sectors each defining a de-icing zone, said control unit activating said windshield wiper to wipe only one small angular sector at a time in order to de-ice said windshield in part.

The de-icing means are then coupled to the windshield wiper. The position of the windshield wiper on the windshield then determines the de-icing zone that is to be heated. Furthermore, the windshield wiper may serve to remove the ice after de-icing.

In addition, the total angular sector optionally extends angularly upwards in an elevation direction of the windshield from a bottom first small angular sector to a top last small angular sector, the control unit causing the small angular sectors to be de-iced in succession in a predetermined cycle beginning with the bottom first small angular sector and ending with the top last angular small angular sector.

The terms "low" and "high" refer to a direction in elevation going from a low portion of the aircraft towards a high portion carrying a rotor.

Given the aerodynamic stream of air impacting the windshield in flight, de-icing is performed using a cycle that consists in de-icing as a priority the de-icing zone that is the lowest in order to obtain better removal of ice.

In a third embodiment, the ice treatment device has at least two de-icing means respectively for de-icing two distinct de-icing zones, said control unit acting in the presence of ice to activate only one de-icing means at a time in order to unstick ice and causing said windshield wiper to wipe in order to remove the unstuck ice.

This variant consists in de-icing the predetermined de-icing zone in powerful pulsed manner in order to unstick the ice at the interface with the glazed surface of the windshield, followed by facilitating removal of the ice taken away by the mechanical action of the windshield wiper.

For example, each de-icing means operate after an electrical pulse has been delivered by a low voltage energy storage system of the type comprising a capacitor charged at 28 V direct current, for example, and capable of delivering its energy in a relatively short length of time and at high voltage.

The treatment unit couples this high energy portion with control of the windshield wiper.

For example, the ice treatment device includes a treatment measurement system, the control unit causing the windshield wiper to wipe in order to remove the unstuck ice starting from a threshold temperature. The windshield wiper is thus controlled on the basis of information about surface temperature coming from the glazed surface of the windshield.

Furthermore, the ice treatment device may include a selector member connected to the control unit and operable by an individual in order to define said given cycle. Such a selector member may also enable the ice treatment device to be stopped or put into operation.

In addition, the invention also provides an aircraft having at least one windshield, the aircraft including at least one ice treatment device for combating a deposit of ice on the windshield.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 is a diagrammatic view of an aircraft provided with an ice treatment device;

FIG. 2 is a view of a first embodiment of an ice treatment device;

FIG. 3 is a view of a second embodiment of an ice treatment device;

FIG. 4 is a view of a third embodiment of an ice treatment device; and

FIG. 5 is a view of a canopy having a plurality of windshields facing a pilot and a copilot.

Elements present in more than one of the figures are given the same references in each of them.

DETAILED DESCRIPTION OF THE INVENTION

Three mutually orthogonal directions X, Y, and Z are shown in FIG. 1.

The first direction X is said to be longitudinal. The second direction Y is said to be transverse. Finally, the third direction Z is said to be in elevation.

FIG. 1 shows an aircraft 1 of the invention.

The aircraft 1 has a fuselage 2 extending longitudinally from a front end 4 to a rear end 5, and transversely from a left side 9 to a right side 8.

The fuselage 2 also extends in elevation from a low portion 6 towards a high portion 7. In a rotorcraft, the high portion is surmounted by a rotor 3 for providing lift and possibly also propulsion.

The aircraft 1 also has a cabin defined by a canopy 300 including at least one windshield 10. An individual 200 sitting in the cabin can then view the external surroundings EXT outside the aircraft though each windshield 10. For this purpose, a windshield usually comprises a surface that is transparent to visible light.

During a flight under icing conditions, ice might adhere to the windshields. When such icing conditions come to an end, the ice that has formed is liable to limit an individual's visibility to the external surroundings EXT.

Consequently, the aircraft has an ice treatment device, referred to more simply below as a device 30.

Depending on the method applied, a manufacturer defines for at least one windshield at least two distinct de-icing zones 20. Each de-icing zone then covers a small area of a windshield.

During a de-icing step, the de-icing zones 20 are de-iced in succession and in a given cycle using at least de-icing means. The de-icing zones 20 are then de-iced not simultaneously, but one after the other, and more particularly in a cycle that is established as a function of the visibility to which a pilot gives preference.

By way of example, this de-icing step may be performed at the end of a stage of flight in icing conditions, or indeed as a result of a voluntary request made by an individual.

FIGS. 2 to 5 show embodiments of the device 30 enabling the method to be performed.

Independently of the embodiment, and with reference to FIG. 2, the device 30 has at least one de-icing means 40 suitable for de-icing an area. FIG. 2 shows an aircraft having a canopy with two windshields, each having a plurality of de-icing means.

By way of example, each de-icing means 40 may be powered electrically by a battery (not shown).

Furthermore, the device 30 is provided with a control unit 55 connected to each de-icing means 40. By way of example, the control unit 55 may comprise an electronic circuit and/or possibly also a calculation member such as a processor executing instructions stored in a non-volatile memory.

The control unit 55 is also connected to an ice detection system 35. The ice detection system 35 may comprise an ice sensor, temperature measurement means, or indeed a member receiving data, in particular meteorological data, serving to determine that an aircraft is flying in icing conditions.

The control unit 55 may also communicate with at least one temperature measurement system 60 measuring the temperature of the windshield on a face associated with the external surroundings outside the aircraft, for example. By way of example, each windshield zone that is de-iced by de-icing means is provided with a temperature measurement system 60.

Furthermore, the device 30 may include a selector member 70 for requesting that the de-icing process be put into operation or stopped, or indeed for informing the control unit which specific given de-icing cycle should be applied. In alternative or additional manner, the de-icing cycle may be stored in the control unit.

In the embodiment of FIG. 2, the device 30 is provided with at least two de-icing means 40 per windshield. For example, the device 30 comprises one de-icing means per de-icing zone.

Each de-icing means 40 may be fastened to the windshield so as to cover the de-icing zone that is to be treated, or indeed it may be incorporated in the windshield. For example, each de-icing means may be conventional means provided with a resistive fabric spread over the area of the corresponding de-icing zone.

Each de-icing means is then connected by a wired or wireless connection to the control unit 55.

For example, the device 30 has at least one front de-icing means 41 for de-icing a front zone 21, the front zone giving a pilot forward visibility towards the front of the aircraft.

Furthermore, the device 30 may include at least one lateral de-icing means 42 for de-icing a lateral zone 22 of the windshield to give a pilot lateral visibility towards a side of the aircraft.

The device 30 may also include at least one bottom de-icing means 43 for de-icing a low zone 23 of the windshield to give a pilot downward visibility relative to the aircraft.

For at least one windshield, the device 30 thus has at least two de-icing means that may be selected from the following list: front de-icing means; lateral de-icing means; and bottom de-icing means.

FIG. 5 shows a canopy having two top windshields 301, 304, two intermediate windshields 302, 305, and two bottom windshields 303, 306 respectively facing the head, the torso, and the feet of a pilot and of a copilot.

Each top windshield 301, 304 may then have a plurality of front zones 21. Each intermediate windshield 302, 305 has a plurality of side zones 22, and each bottom windshield 303, 306 has a plurality of low zones.

With reference to FIG. 2, when the aircraft is flying in icing conditions, the treatment unit can inhibit the de-icing means. De-icing is then not active.

In contrast, when the aircraft exits icing conditions, the treatment unit activates the de-icing means one after another in order to de-ice the de-icing zones in succession in a given cycle. Optionally, the treatment unit may determine that the aircraft is exiting icing conditions with the help of the ice detection system 35.

During the de-icing step, the treatment unit may for example operate only the front de-icing means in order to de-ice the front zones one after another, followed by the lateral de-icing means, and finally by the bottom de-icing means. This cycle may be stored in the treatment unit, or may result from a command issued by the selector member 70.

The treatment unit may stop activating each de-icing means after a given length of operating time, or as a function of treatment information such as the temperature of the windshield in the de-icing zone, for example.

In the embodiments of FIGS. 3 and 4, the ice treatment device 30 includes a windshield wiper 50. The windshield wiper 50 is provided with a blade 51 that is moved by a motor 52 in order to wipe an angular quadrant referred to as a total angular sector 100.

In the embodiment of FIG. 3, the blade 51 carries de-icing means 44. For example, the blade carries de-icing means that operate by laser emission or infrared emission. Alternatively, the de-icing means may comprise an induction coil or an electrical conductor.

Under such circumstances, the manufacturer subdivides the total angular sector 100 into a plurality of smaller angular sectors, and in particular into six distinct small angular sectors 104, 105, 106, 107, 108, and 109 in this example. More particularly, the total angular sector 100 extends angularly and upwards in an elevation direction of the windshield 10 from a bottom first small angular sector 104 towards a top last small angular sector 109.

Each small angular sector 104, 105, 106, 107, 108, and 109 then defines a respective de-icing zone 24, 25, 26, 27, 28, and 29.

During a de-icing step, the control unit 55 activates the windshield wiper so that it does not wipe the total angular sector, but rather only a single small angular sector 104, 105, 106, 107, 108, or 109 at a time. For example, the control unit requires the small angular sectors to be de-iced in succession in a predetermined cycle beginning with the bottom first small angular sector 104 and continuing with the adjacent sector until reaching the top last small angular sector 109. Consequently, the de-icing means de-ice the first small angular sector 104, and then in succession the second small angular sector 105, the third small angular sector 106, the fourth small angular sector 107, the fifth small angular sector 108, and finishes with the last small angular sector 109.

In the embodiment of FIG. 4, the ice treatment device 30 has at least two de-icing means 41, 42, 43 respectively for de-icing two distinct de-icing zones 21, 22, 23. For example, the device 30 has at least two of the following means: front de-icing means; lateral de-icing means; and bottom de-icing means.

During the de-icing step, the control unit 55 then activates only one de-icing means at a time in order to separate the ice from the corresponding de-icing zone. After activating one of the de-icing means and before possibly actuating another de-icing means, the control unit 55 operates the windshield wiper 50 to wipe away the ice that has become unstuck. The control unit 55 can request operation of the windshield wiper 55 starting from a threshold temperature.

Each de-icing zone may have a shape that is determined by the path followed by the windshield wiper so as to avoid having a given windshield wiper wiping both a zone that has been de-iced and a zone that has not been de-iced.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of treating ice for a canopy of an aircraft, the canopy including a windshield, the method comprising:
defining at least two distinct de-icing zones of the aircraft windshield; and
performing a de-icing step including temporarily activating, by a control unit, at least one de-icing means to automatically de-ice the de-icing zones in succession in a given cycle based on importance for visibility made available to crew, wherein only one de-icing zone is de-iced at a time.

2. The method according to claim 1, wherein the de-icing step is performed when the aircraft is no longer flying in icing conditions, or at the request of a pilot.

3. The method according to claim 1, wherein the aircraft extends longitudinally from a front end to a rear end, and at least one de-icing zone referred to as a "front" de-icing zone is defined on the windshield for giving a pilot forward visibility towards the front of the aircraft.

4. The method according to claim 1, wherein the aircraft extends laterally from a left side to a right side and in elevation from a low portion to a high portion, and at least one de-icing zone referred to as a "lateral" zone is defined the windshield for giving a pilot lateral visibility towards one side of the aircraft.

5. The method according to claim 1, wherein the aircraft has a windshield wiper capable of wiping a predetermined total angular sector, and the total angular sector is subdivided into a plurality of distinct small angular sectors each defining a de-icing zone.

6. An ice treatment device for a canopy of an aircraft, the canopy including at least one windshield having at least two distinct de-icing zones, the ice treatment device comprising:
at least one de-icing means;
an ice detection system; and
a control unit configured to communicate with the de-icing means to automatically de-ice the at least two de-icing zones of the at least one aircraft windshield in succession in application of a given cycle based on importance for visibility made available to crew, so that only one de-icing zone is de-iced at a time.

7. The ice treatment device according to claim 6, wherein the ice treatment device includes at least two de-icing means for de-icing respective distinct de-icing zones, the control unit being configured to activate the two de-icing means one after another.

8. The ice treatment device according to claim 7, wherein the aircraft extends longitudinally from a front end to a rear end, and the at least two de-icing means comprise at least front de-icing means arrangeable at a de-icing zone referred to as a "front" zone of the at least one windshield for giving a pilot forward visibility towards the front of the aircraft, the control unit being configured to initially activate the front de-icing means in the event of ice being detected.

9. The device according to claim 6, wherein the aircraft extends laterally from a left side to a right side and in elevation from a low portion to a high portion, and the at least two de-icing means comprise at least one lateral de-icing means arrangeable at a de-icing zone referred to as a "lateral" zone of the at least one windshield for giving a pilot lateral visibility towards one side of the aircraft.

10. The device according to claim 6, wherein the aircraft extends laterally from a left side to a right side and in elevation from a low portion to a high portion, and the at least two de-icing means comprise at least one bottom de-icing means arrangeable at a de-icing zone referred to as a "low" zone of the at least one windshield for giving a pilot downward visibility relative to the aircraft.

11. The device according to claim 6, wherein the aircraft extends laterally from a left side to a right side and in elevation from a low portion to a high portion, and the at least two de-icing means comprise at least one lateral de-icing means arrangeable at a de-icing zone referred to as a "lateral" zone of the at least one windshield for giving a pilot lateral visibility towards one side of the aircraft and at least one bottom de-icing means arrangeable at a de-icing zone referred to as a "low" zone of the at least one windshield for giving a pilot downward visibility relative to the aircraft.

12. The ice treatment device according to claim 6, wherein the ice treatment device includes a windshield wiper carrying de-icing means, the windshield wiper being capable of wiping a predetermined total angular sector, the total angular sector including a plurality of distinct small angular sectors each defining a de-icing zone, the control unit being configured to activate the windshield wiper to wipe only one small angular sector at a time in order to de-ice one of the at least one windshield in part.

13. The ice treatment device according to claim 12 wherein the total angular sector extends angularly upwards in an elevation direction of the one windshield from a bottom first small angular sector to a top last small angular sector, the control unit being configured to cause the small angular sectors to be de-iced in succession in a predetermined cycle beginning with the bottom first small angular sector and ending with the top last angular small angular sector.

14. An ice treatment device according to claim 6, wherein the ice treatment device has at least two de-icing means respectively for de-icing two distinct de-icing zones, the control unit being configured to act in the presence of ice to activate only one de-icing means at a time in order to unstick ice and cause a windshield wiper to wipe in order to remove the unstuck ice.

15. The ice treatment device according to claim 12, wherein the ice treatment device includes a treatment measurement system, the control unit being configured to cause the windshield wiper to wipe in order to remove unstuck ice starting from a threshold treatment.

16. The ice treatment device according to claim 6, wherein the ice treatment device includes a selector member connected to the control unit and operable by an individual in order to define the given cycle.

17. An aircraft having at least one windshield and the ice treatment device according to claim 6.

18. The method according to claim 1, wherein the aircraft extends laterally from a left side to a right side and in elevation from a low portion to a high portion, and at least one de-icing zone referred to as a "low" de-icing zone is defined for giving a pilot downward visibility relative to the aircraft.

19. A method of treating ice for a canopy of an aircraft, the canopy including at least one windshield, the method comprising:

defining at least two distinct de-icing zones of the at least one aircraft windshield; and performing a de-icing step including temporarily activating, by a control unit, at least one de-icing means to automatically de-ice the de-icing zones in succession in a determined order, wherein only one de-icing zone is de-iced at a time.

20. The method according to claim 19 wherein the determined order is based on visibility made available to crew.

* * * * *